July 14, 1942.  A. R. FLINK  2,290,126
DISTRIBUTOR TRUCK
Filed July 27, 1939  3 Sheets-Sheet 1
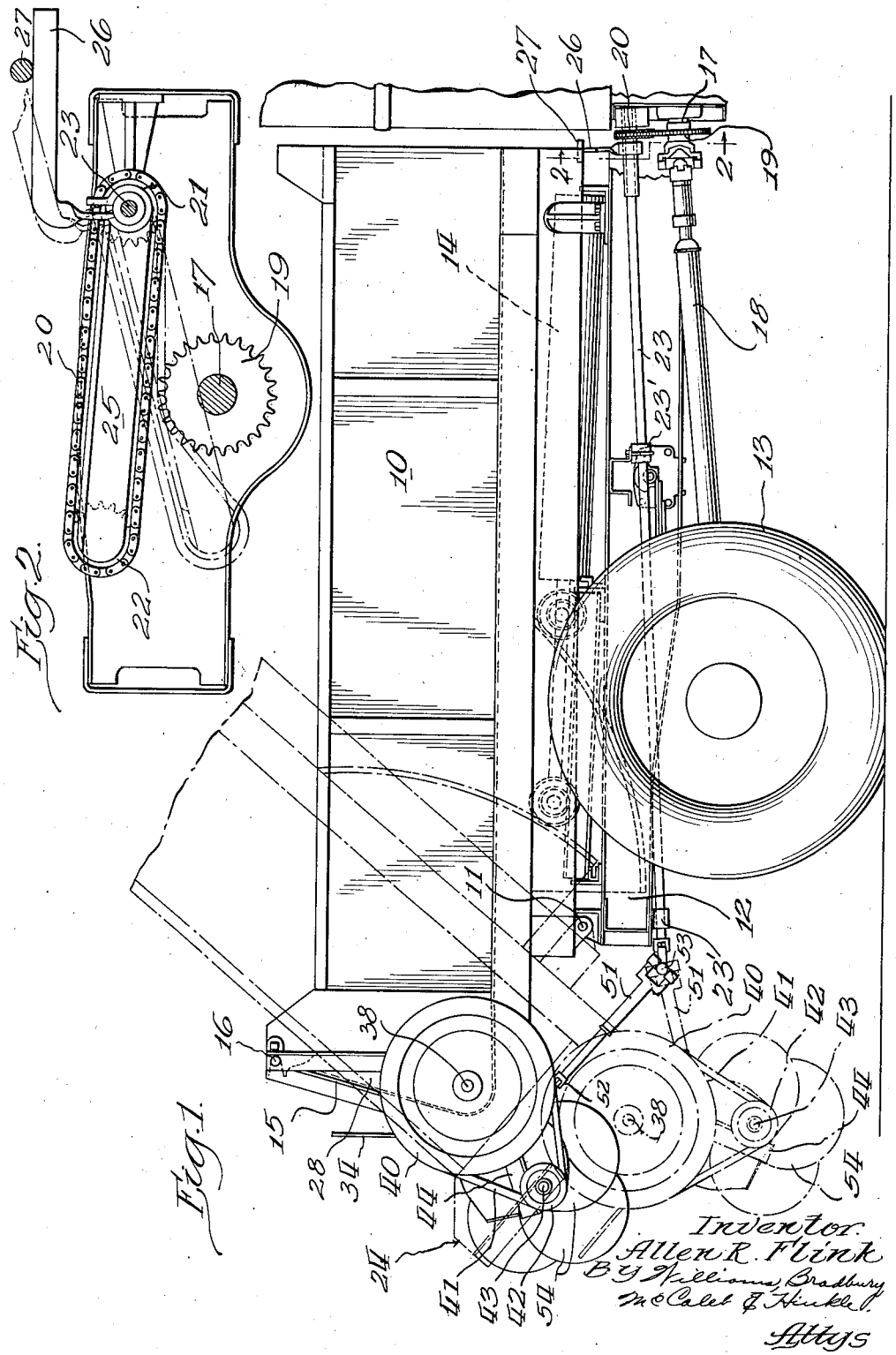

July 14, 1942.  A. R. FLINK  2,290,126
DISTRIBUTOR TRUCK
Filed July 27, 1939  3 Sheets-Sheet 2
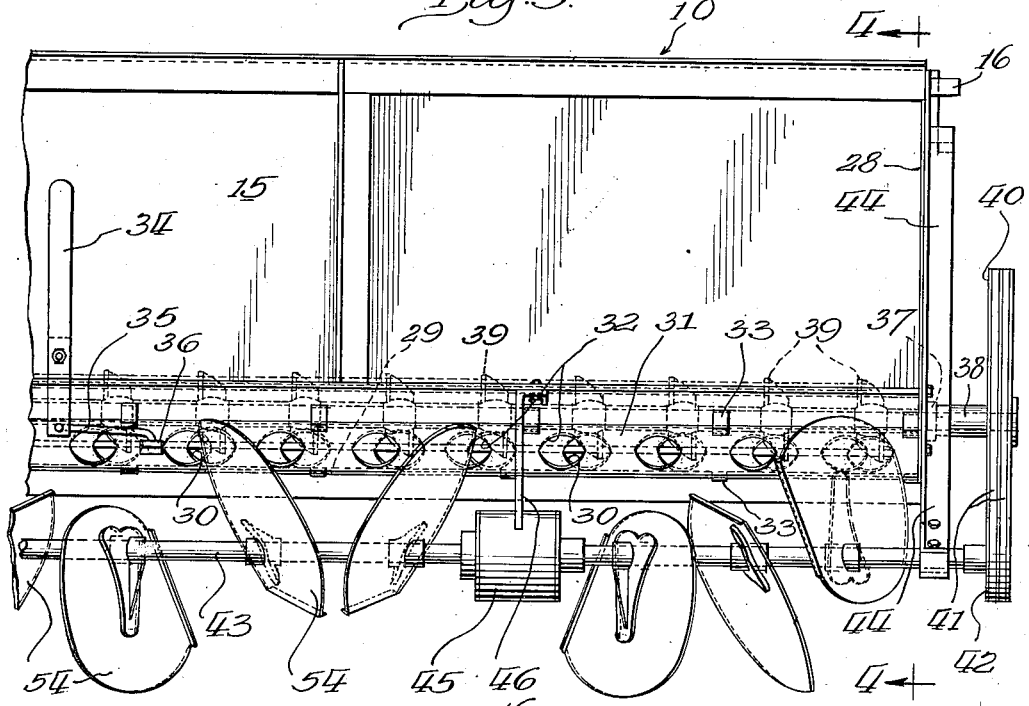
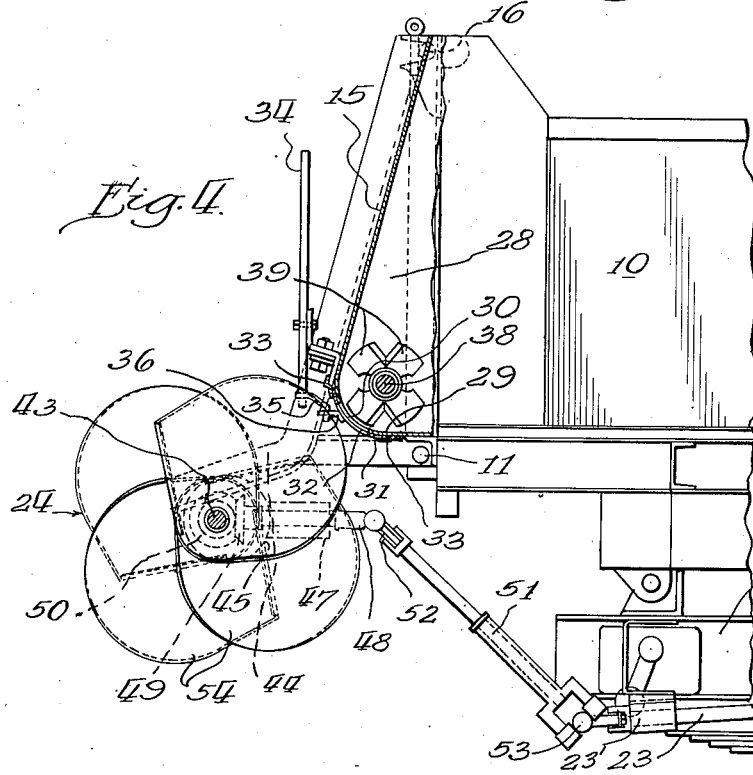
Inventor
Allen R. Flink
By
Williams, Bradbury,
McCaleb & Hinkle
Attys July 14, 1942.　　A. R. FLINK　　2,290,126
DISTRIBUTOR TRUCK
Filed July 27, 1939　　3 Sheets-Sheet 3
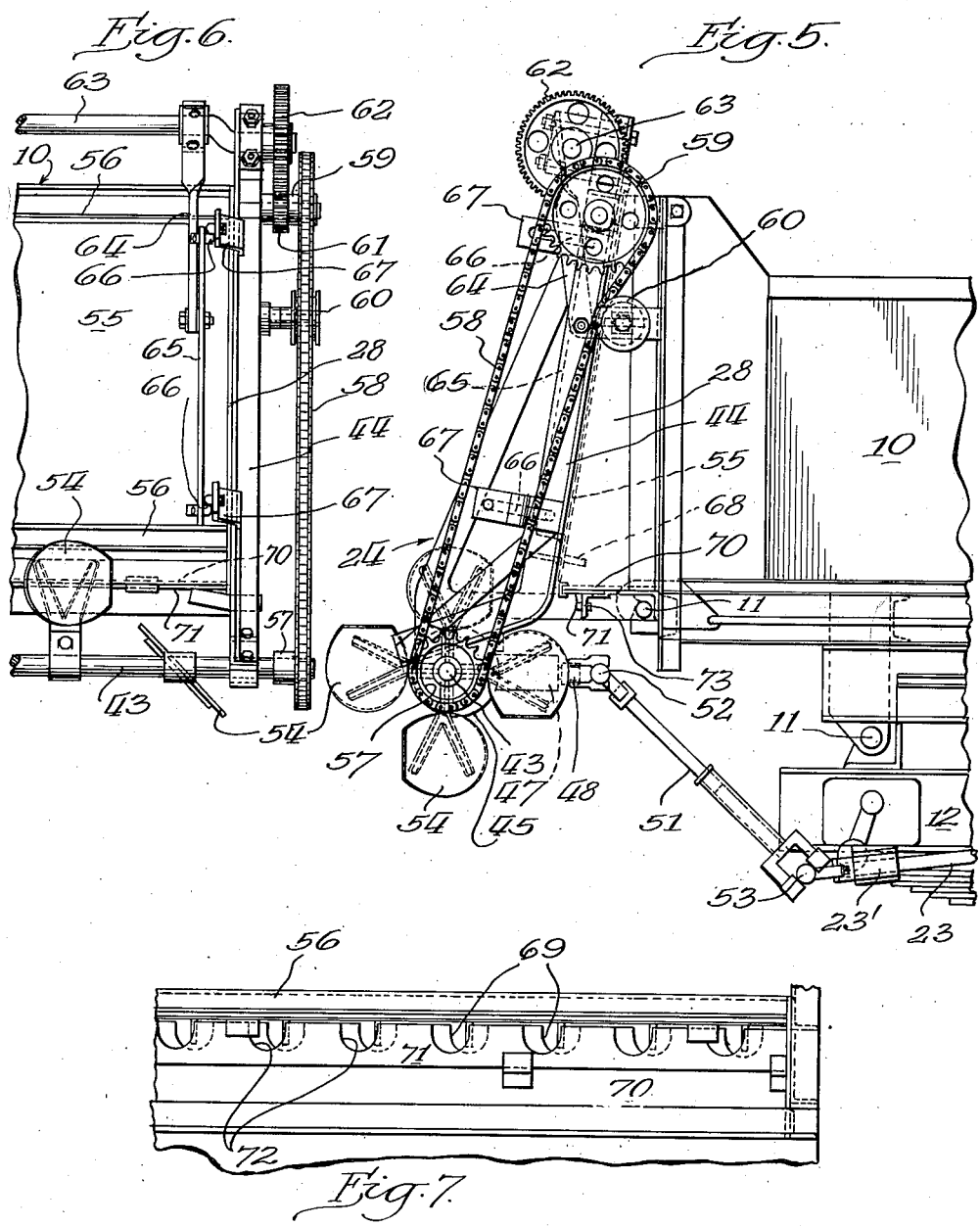
Inventor
Allen R. Flink
By Williams, Bradbury,
McCaleb & Hinkle
Attys.

Patented July 14, 1942

2,290,126

UNITED STATES PATENT OFFICE 2,290,126

DISTRIBUTOR TRUCK

Allen R. Flink, Streator, Ill.

Application July 27, 1939, Serial No. 286,756

21 Claims. (Cl. 275—8)

This invention relates to improvements in trucks, particularly trucks intended for the transportation and the distribution of finely divided, ground and pulverulent material, for example, ground limestone, lime, sand and the like.

One of the objects of the invention is to provide a dump truck provided with distributor mechanism and means whereby the distributor mechanism is rendered operative when the truck body is elevated.

A further object of the invention is to provide a truck equipped with distributor means, which is normally inoperative and which is adapted to be brought into operation by power actuated means controlled by the truck driver.

A further object of the invention is to provide an improved distributing apparatus which is adapted to be applied to the rear end of a conventional dump truck.

A further object of the invention is to provide an improved distributor for finely divided, granular and pulverulent materials.

Other objects, advantages, and capabilities of the invention will appear from the following description thereof, taken in conjunction with the accompanying drawings, in which:

Fig. 1 is a side elevation of a truck equipped with my improved distributor, the relation of the distributor parts during operation being shown in dot and dash lines;

Fig. 2 is a transverse sectional detail taken on the line 2—2 of Fig. 1, showing part of the distributor drive mechanism, the same being shown in dot and dash lines in its operating position;

Fig. 3 is a fragmentary rear elevation of the distributor mechanism;

Fig. 4 is a sectional view therethrough taken on the line 4—4 of Fig. 3;

Fig. 5 is a fragmentary side elevational view of the rear end of a wagon provided with a modified embodiment of my invention;

Fig. 6 is a fragmentary rear elevational view thereof; and

Fig. 7 is a fragmentary view seen from below showing the primary discharge openings and associated parts.

Referring to the drawings, particularly to Figs. 1 to 4 thereof, the reference numeral 10 indicates the body of a truck which is pivotally mounted on trunnions 11 to a frame 12, which is supported on the wheels 13 in the usual manner. The trunnions 11 are located below and near the rear end of the truck as best seen in Fig. 1.

Suitable hoist means, indicated by way of example at 14, are provided whereby the body may be raised upwardly about the trunnions 11 from normal into dumping position. Such a truck is normally equipped with a rear door 15 which is pivotally mounted at its upper end, for example, at trunnions 16, so that this door may normally swing outwardly into the position in which it is shown in Fig. 1.

In order to equip such a truck for my improved distributor, it is necessary to provide a drive take-off which is preferably driven when the truck is driven. For this purpose I mount on the drive shaft 17, which is operatively connected to the rear wheels through a propeller shaft 18, a sprocket wheel 19. This sprocket wheel is adapted to be engaged by a sprocket chain 20 which passes over a sprocket wheel 21 and an idler sprocket wheel 22. The sprocket wheel 21 is rigidly mounted on a shaft 23 which serves as the drive shaft for my distributor, which is designated generally by the reference numeral 24. The shaft 23 is supported from the chassis by bearings 23'.

An arm 25 is pivotally mounted on the shaft 23 adjacent the sprocket 21 and this arm extends inwardly beyond the sprocket wheel 19. At its end remote from the shaft 23, it provides a mounting for the sprocket wheel 22. The sprocket wheels 19, 21 and 22 and the sprocket chain 20 are located in the same plane so that the chain may be moved into engagement with the sprocket 19 as shown in dot and dash lines in Fig. 2, or out of engagement with the sprocket wheel 19, as shown in full lines in this figure.

The arm 25 rigidly carries an outwardly directed arm 26 which is adapted to be engaged by a pin 27 mounted on the forward end of the body 10, when that body is in its downward position. It will readily be understood that when the body is in its downward or normal position, the sprocket chain 20 will be disengaged from the sprocket wheel 19. Consequently, the drive of the shaft 23 is terminated. When, however, the body 10 is elevated, for example, by the hoist 14, the arm 25 moves into its dot and dash line position, shown in Fig. 2, the weight of the arm 25, chain 20, and spocket wheel 22 biassing the arm towards this position. When it obtains this relation, the sprocket wheel 21 is driven when the shafts 17 and 18 rotate, that is, whenever the truck is driven over the field. It will be readily understood that when the body 10 is elevated, the pulverulent or granular load therein tends to move rearwardly towards the location of the distributor 24.

In order to install my improved distributor, it is necessary to open door 15 to a certain extent, as shown in Fig. 4. The distributor comprises two plates 28 of general triangular form which close the openings between the door and the sides of the body. The space between the lower edge of the door and the rear edge at the bottom of the truck is occupied by a plate 29. It will, of course, be understood that plates 28 and 29 are rigidly connected to the door 15 and to the body of the truck so as to provide, in effect, a rear extension of that body which is closed by the door 15.

As best seen in Fig. 4, part of the plate 29 is of arcuate form and it is provided in this arcuate portion with a series of openings 30 for the discharge of the pulverulent or granular material from the truck.

An outer plate 31 of complementary form and provided with similar openings 32 is mounted on the outer side of plate 29. The plate 31 is slidable, being mounted by the aid of suitable clips 33 on the plate 29 and on the door 15. Suitable means are provided for sliding the plate 31 relatively to the plate 29 so as to adjust the degree of alignment between the openings 30 and 32. This means may suitably take the form of a lever 34 pivotally mounted on the door 15. This lever is connected by means of a link 35 to a lug 36 on the plate 31. It will readily be understood that when the lever 34 is thrown in one direction, the plate 31 is thrown in the opposite direction. Consequently, the degree of alignment of the openings 30 and 32 can be adjusted at will.

Suitable bearings 37 are mounted on the plates 28 for a shaft 38, the axis of which is located substantially at the axis of curvature of the plates 29 and 31. The shaft 38 carries a plurality of radial members or paddles 39 adjacent each of the openings 30. During transportation with the body in normal position the shaft 38 is not in operation and consequently, the paddles 39 serve as an obstruction preventing the escape of any substantial amount of pulverulent or granular material through the openings. When, however, the shaft 38 is put into rotation, the paddles 39 serve to feed the granular or pulverulent material at a substantially uniform rate, which rate can be adjusted by actuation of the lever 34 as above described.

The outer end of the shaft 38 carries a pulley 40 which serves for the drive of the shaft. The pulley 40 is connected by belts 41 to a pulley 42 which is rigidly mounted on one end of a shaft 43. The shaft 43 is rotatably mounted in bearings at the lower end of angle irons 44 mounted on the door 15 at each end thereof. The angle iron members 44 have rearward extensions upon which the bearings for the shaft 43 are mounted.

The shaft 43 extends through a housing 45 which is rigidly mounted on the lower edge of the door 15 by means of an arm 46. The housing is provided with a forward extension 47 which serves as a bearing for a stub shaft 48. The stub shaft carries a bevel gear 49 in mesh with a bevel gear 50 rigidly carried by the shaft 43 within the housing 45. The shaft 48 is operatively connected to the shaft 23 by means of a telescopic shaft 51 at the ends of which are universal joints 52 and 53. These universal joints and the telescopic nature of the shaft 51 enables the body to be tilted between the full line position and the dot and dash lined position shown in Fig. 1, without any special attention to the driving mechanism. It will be noted, however, that when the truck is adjusted to elevated distributing position, the shafts 23, 51 and 48 are in substantial alignment.

The shaft 43 carries a series of distributing blades or plates 54 which are located in oblique relation to the shaft, as best seen in Fig. 3. The shaft extends through each plate 54 in substantially eccentric relation, that is, it extends through an opening in the plate relatively close to one side thereof. The plates consist of two sets, those on the right-hand side being located relative to the shaft so as to throw the material being distributed rearwardly and to the right. The other set of plates throws the material rearwardly and to the left. It will be noted with reference to Figs. 3 and 6 that the plates of each set are relatively orientated in angular direction relative to the shaft 43.

It will be understood from Fig. 1 that when the truck body is in discharging position, that is, the position shown in dot and dash lines in Fig. 1, the distributing blades 54 are located immediately below the aligned discharge openings 30 and 32 so that the pulverulent or granular material drops by gravity downwardly until it engages the blades 54, whereupon it is distributed uniformly over a wide area, for example, an area of over three times the width of the truck.

The operation is as follows: The truck is loaded with ground limestone, for example, the body 10 being in the full line position shown in Fig. 1. If desired, the openings 30 and 32 may be brought out of alignment by suitable actuation of the handle 34. Ordinarily, however, this is not necessary since the paddles 39 serve as obstructions, preventing any excessive leakage of the material through the aligned openings 30 and 32. Owing to the low normal position of the body 10, the arm 26 is depressed by the pin 27 and the chain 20 is elevated out of engagement with the sprocket wheel 19. Consequently, during transportation when the body is in normal position the shaft 23 is not driven and consequently none of the driven elements of the distributor is put into motion.

When the truck arrives at the location in which its contents are to be distributed, the driver actuates the hoist 14 so as to elevate the body 10 to some extent at least, that extent being short of a position in which the load might escape from the upper edge of the back of the door. This elevation of the body 10 and the pin 27 causes the chain 20 to engage the sprocket wheel 19 and the shaft 23 is thereby operatively engaged to the shafts 17 and 18. When the truck is put into motion, the shaft 17 rotates and likewise the shaft 23 so that the distributor mechanism 24 goes into operation.

This drive is effective through the shafts 23, 51 and 48 to effect the driving of the shaft 43. The driving of the shaft 43 results in the driving of the shaft 38 and consequently the paddles 39 are put into operation to deliver a substantially constant supply of limestone or other granular or pulverulent material to the distributing blades 54. These blades throw the discharged material uniformly over a wide strip as the truck moves over the field. When the truck is arrested, the discharge of lime or other material also stops.

In the embodiment of the invention illustrated in Figs. 5, 6 and 7, most of the parts are substantially identical with the corresponding elements of the previously described embodiment and consequently they are designated by the same reference numerals. In other words, it is to be understood that the drive and control elements, the shaft 43 and the blades 54 are substantially similar to those previously described in connection with Figs. 1 to 4. The present embodiment will, therefore, be completely described by merely pointing out the features in which it differs from that of the previously described embodiment.

In this embodiment the panel 55 of the rear door is separated from its framework 56 so that it may be caused to slide up and down to a slight extent relative to this framework. The framework carries the angle members 44 on which the shaft 43 is supported, as in the previously described embodiment. Instead of the pulley 42, the shaft 43 carries a sprocket wheel 57 over which extends a sprocket chain 58. This sprocket chain passes around a sprocket wheel 59 mounted on a stub axle carried by the right-hand angle iron 44 adjacent its upper end.

The sprocket chain 58 is held taut by means of an idler 60, the position of which may be adjusted at will. A pinion 61, which is integral with or rigidly connected to the sprocket wheel 59 cooperates with a gear 62 rigidly mounted on one end of a crank shaft 63. The crank shaft extends across the rear end of the truck, being provided with bearings in the upper ends of the angle members 44. Adjacent each end the crank shaft 63 is provided with a pitman 64 which is pivotally connected to a bar 65 rigidly connected to the panel 55. It will thus be seen that when the distributor is working the crank 63 through the pitman 64, the panel 55 is moved upwardly and downwardly. The panel 55 is supported against the frame 56 and is also supported by crank members 66 which have inner horizontal ends extending through openings in the bars 65 and outer horizontal ends which extend through openings in lugs 67 which are rigidly mounted on the angle members 44.

The panel 55 is provided with a series of pins 68 which are rigidly mounted on the panel near its lower end, so as to extend over scalloped openings 69 in a plate 70 which serves as a continuation for the bottom of the truck. This plate 70 is closely analogous to the plate 29 of the previously described embodiment. It is, however, a flat plate in this particular embodiment.

A plate 71, provided with similar openings 72, is slidably mounted immediately below the plate 70. The degree of registry between the openings 69 and 72 can be controlled by any suitable means, as suggested diagrammatically at 73. As in the previously described embodiment, the aligned openings 69 and 72 are adapted to be vertically above the plates 54 when granular material is being discharged.

The operation of this embodiment of the invention will be apparent from the description of the operation of the previously described embodiment. When the granular material is being transported with the body in normal position the distributor is inoperative and the pins 68 serve to prevent any substantial loss of material through the aligned openings 69 and 72. When the body 10 of the truck is elevated by the hoist 14, the distributor is connected to the truck drive and when the truck is driven across the field the pins 68 are moved up and down to effect discharge of the pulverulent or granular material through the openings 72, 69 and the distributor blades 54 are operated to distribute the material over a large strip of ground. When the truck is stopped the distributor stops and when the body 10 is returned to its original normal position the distributor is rendered inoperative, even when the truck is driven. It will, of course, be understood that the movement of the truck body towards dumping position serves not only to render the distributor operative, but serves to cause the pulverulent or granular material to move rearwardly towards the distributor so that the complete load may be distributed without the necessity of any handling during distribution.

Although the invention has been described in connection with the specific details of preferred embodiments thereof, it must be understood that such details are not intended to be limitative of the invention except in so far as set forth in the accompanying claims.

Having thus described my invention, what I claim as new and desire to secure by Letters Patent of the United States is:

1. In a distributor truck, in combination, a truck body adapted to be hoisted from normal position, a distributor for finely divided material at the lower end of the hoisted body, means for driving said distributor, means operatively connecting the driving means to the drive of the truck and biased to connecting position, and means associated therewith engaged by said body only in normal position to hold said means in disconnecting position.

2. In a distributor truck, in combination, a truck body adapted to be elevated towards dumping position, a distributor for finely divided material at the lower end of the elevated body, means for driving said distributor, means for operatively connecting said driving means to the wheels of the truck and biassed to connecting position, and means engaged by the body only in its normal position to disconnect the operative connection.

3. In a distributor truck, in combination, a truck body adapted to be hoisted from normal position, a distributor for finely divided material at the lower end of the hoisted body comprising operative means for effecting discharge of said material, means including a shaft and a series of distributing blades, the blades being located vertically below the discharge means when the truck is hoisted, and means for effecting the drive of said operative means and said shaft, and means biassed to drive connecting relation and engaged by said body in normal position for operatively disconnecting last said means from the drive of the wheels of the truck.

4. In a distributor truck, in combination, a truck body adapted to be hoisted from normal position, a distributor for finely divided material at the lower end of the hoisted body comprising a wall provided with openings, operative means above said openings adapted, when driven, to agitate the material above the openings, and, when not driven, to prevent any substantial leakage of the material through the openings, means including a shaft and a series of distributing blades, the blades being located vertically below the discharge means when the truck is hoisted, means for effecting the drive of said operative means and said shaft, and means controlled by said body for operatively connecting and disconnecting last said means to the drive of the wheels of the truck.

5. In a distributor truck, in combination, a truck body adapted to be hoisted from normal position, a distributor for finely divided material at the lower end of the hoisted body comprising a wall provided with openings, operative means above said openings adapted, when driven, to agitate the material above the openings, and, when not driven, to prevent any substantial leakage of the material through the openings, means including a shaft and a series of distributing blades, the blades being located vertically below the discharge means when the truck is hoisted, and means for effecting the drive of said operative means and said shaft operatively connected to the drive of the wheels of the truck, and means engaged by said body in its normal position for operatively disconnecting last said means from the drive of the wheels of the truck.

6. In a distributor truck, in combination, a truck body adapted to be elevated towards dumping position, a distributor for finely divided material at the lower end of the elevated body, means for driving said distributor including a shaft, and means for operatively connecting said shaft to the wheels of the truck including a frame pivotally mounted on the truck chassis and normally biased to connecting position, said body being adapted to engage and swing said frame about its pivot to disconnecting position when the body moves to normal position and to move clear of said frame when the body moves toward dumping position.

7. In combination, a dump truck including a body having a pivotal mounting adjacent its rear end and adapted to be hoisted, a rear door connected to the body adjacent its upper end, a distributor for finely divided material maintaining said door in rearwardly displaced position and including walls closing the spaces between the displaced door and the rear of the body, the lower wall being provided with openings, a shaft rotatably mounted in the lateral walls having blades in cooperative relation with said openings, and a shaft provided with oblique blades adapted to be located beneath said openings when the truck body is hoisted towards dumping position, and means for simultaneously driving said shafts, said blades being relatively arranged to distribute the material in the path of the truck and substantially to each side thereof.

8. In combination, a dump truck including a body having a pivotal mounting adjacent its rear end and adapted to be hoisted, a rear door connected to the body adjacent its upper end, a distributor for finely divided material maintaining said door in rearwardly displaced position and including walls closing the spaces between the displaced door and the rear of the body, the lower wall being provided with openings, a shaft rotatably mounted in the lateral walls having blades in cooperative relation with said openings, and a shaft provided with oblique blades adapted to be located beneath said openings when the truck body is hoisted towards dumping position, and means connected to the drive of the wheels of the truck for simultaneously driving said shafts, said blades being relatively arranged to distribute the material in the path of the truck and substantially to each side thereof.

9. In combination, a dump truck including a body having a pivotal mounting adjacent its rear end adapted to be hoisted, a rear door connected to the body adjacent its upper end, a distributor for finely divided material maintaining said door in rearwardly displaced position and including walls closing the spaces between the displaced door and the rear of the body, the lower wall being provided with openings, a shaft rotatably mounted in the lateral walls having blades in cooperative relation with said openings, and a shaft provided with oblique blades adapted to be located beneath said openings when the truck body is hoisted towards dumping position, means for simultaneously driving said shafts, and means controlled by the body for operatively connecting last said drive means to the drive of the truck wheels when the body is elevated and for operatively disconnecting last said means from the drive of the truck wheels when the body is in normal position.

10. In combination, a dump truck including a body having a pivotal mounting adjacent its rear end and adapted to be hoisted, a rear door connected to the body adjacent its upper end, said door comprising a frame and a panel mounted thereon for upward and downward displacement, a distributor for finely divided material maintaining said door in rearwardly displaced position and providing walls closing the spaces between the displaced door and the rear of the body, the lower wall being provided with openings, forwardly projecting members on said panel in cooperative relation with said openings, a shaft for effecting upward and downward movements of said panel, a shaft provided with oblique blades adapted to be located beneath said openings when the truck body is hoisted towards dumping position, and means for simultaneously driving said shafts.

11. In combination, a dump truck including a body having a pivotal mounting adjacent its rear end and adapted to be hoisted, a rear door connected to the body adjacent its upper end, said door comprising a frame and a panel mounted thereon for upward and downward displacement, a distributor for finely divided material maintaining said door in rearwardly displaced position and providing walls closing the spaces between the displaced door and the rear of the body, the lower wall being provided with openings, forwardly projecting members on said panel in cooperative relation with said openings, a shaft for effecting upward and downward movements of said panel, a shaft provided with oblique blades adapted to be located beneath said openings when the truck body is hoisted towards dumping position, and means operatively connected to the drive of the wheels of the truck for simultaneously driving said shafts.

12. In combination, a dump truck including a body having a pivotal mounting adjacent its rear end and adapted to be hoisted, a rear door connected to the body adjacent its upper end, said door comprising a frame and a panel mounted thereon for upward and downward displacement, a distributor for finely divided material maintaining said door in rearwardly displaced position and providing walls closing the spaces between the displaced door and the rear of the body, the lower wall being provided with openings, forwardly projecting members on said panel in cooperative relation with said openings, a shaft for effecting upward and downward movements of said panel, a shaft provided with oblique blades adapted to be located beneath said openings when the truck body is hoisted towards dumping position, means for simultaneously driving said shafts, and means controlled by the body for operatively connecting last said drive means to the drive of the truck wheels when the body is elevated and for operatively disconnecting last said means from the drive of the truck wheels when the body is in normal position.

13. A distributor for finely divided material adapted to be mounted on the rear end of a dump truck comprising a lower wall and two substantially triangular walls adapted to be mounted between a displaced rear door and the rear of a truck, the lower wall being provided with discharge openings, agitating means above said openings, a drive means for said agitating means, distributing blades below said openings, and means for operating said drive means and said distributing blades simultaneously, said blades being relatively arranged to distribute the material in the path of the truck and substantially to each side thereof.

14. A distributor for finely divided material adapted to be mounted on the rear end of a dump truck comprising a lower wall and two substantially triangular walls adapted to be mounted between a displaced rear door and the rear of a truck, the lower wall being provided with discharge openings, a shaft above said openings having blades adapted to agitate finely divided material thereabove, a shaft having distributing blades below said openings, and drive means adapted to operate said shafts simultaneously, said blades being relatively arranged to distribute the material in the path of the truck and substantially to each side thereof.

15. A distributor for finely divided material adapted to be mounted on the rear end of a dump truck comprising a lower wall and two substantially triangular walls adapted to be mounted between a displaced rear door and the rear of a truck, the lower wall being provided with discharge openings, said displaced rear door comprising a rear plate adapted to move up and down, members on said plate adapted to agitate finely divided material above said openings, distributing blades below said openings, and means for operating said plate and said blades simultaneously.

16. In combination, a truck for holding granular and pulverulent materials and having a restricted opening for the discharge of said materials, agitating means above said opening whereby the granular and pulverulent materials are caused to drop through said opening by gravity, a horizontal series of obliquely arranged blades, means for rotating said series of blades, said blades being arranged to move into the path of the granular and pulverulent materials falling by gravity from said opening, said blades being relatively arranged to distribute said granular and pulverulent materials in the path of the truck and substantially to each side of said path.

17. In combination, a truck adapted to transport granular and pulverulent material, said truck being provided with a transverse series of openings adjacent its rear end whereby granular and pulverulent material may fall by gravity through said openings, a shaft extending above said openings provided with agitating means whereby the material is caused to fall through said openings and descend therefrom by gravity, a horizontal shaft on the exterior of the truck and having its axis parallel to the series of openings, oblique blades carried by said shaft and adapted to move into the path of the material falling from said openings when said horizontal shaft is rotated, and power means for rotating both said shafts, said blades being relatively arranged to distribute granular and pulverulent material rearwardly and to each side of the truck.

18. In a distributor truck, in combination, a truck body adapted to be hoisted from normal position, a distributor for finely divided material at the lower end of the hoisted body comprising a wall conformed and disposed to afford egress means adjacent the bottom of the body and adjacent the lower end of said wall, through which finely divided material may flow outwardly and downwardly from the body, operative means above said egress means adapted, when driven, to agitate the material above the egress means, means including a shaft and a series of distributing blades, the blades being located vertically below the egress means when the truck is hoisted, and means for effecting the drive of said operative means and said shaft.

19. In a distributor truck, in combination, a truck body adapted to be hoisted from normal position, a distributor for finely divided material at the lower end of the hoisted body comprising a wall conformed and disposed to afford egress means adjacent the bottom of the body and adjacent the lower end of said wall, through which finely divided material may flow outwardly and downwardly from the body, operative means above said egress means adapted, when driven, to agitate the material above the egress means, means including a shaft and a series of distributing blades, the blades being located vertically below the egress means when the truck is hoisted, and means adapted to be connected operatively to the wheels of the truck for effecting the drive of said operative means and said shaft.

20. In a distributor truck, in combination, a truck body adapted to be hoisted from normal position, a distributor for finely divided material at the lower end of the hoisted body comprising a wall conformed and disposed to afford egress means adjacent the bottom of the body and adjacent the lower end of said wall, through which finely divided material may flow outwardly and downwardly from the body, operative means above said egress means adapted, when driven, to agitate the material above the egress means, and, when not driven, substantially to prevent leakage of the material through the egress means, means including a shaft and a series of distributing blades, the blades being located vertically below the egress means when the truck is hoisted, means for effecting the drive of said operative means and said shaft, and means for regulating said egress means to increase or diminish the supply of material to said blades uniformly across said body.

21. In a distributor truck, in combination, a truck body adapted to be hoisted from normal position, a distributor for finely divided material at the lower end of the hoisted body comprising a wall conformed and disposed to afford egress means adjacent the bottom of the body and adjacent the lower end of said wall. through which finely divided material may flow outwardly and downwardly from the body, operative means above said egress means adapted, when driven, to agitate the material above the egress means, and, when not driven, substantially to prevent leakage of the material through the egress means, means including a shaft and a series of distributing blades, the blades being located vertically below the egress means when the truck is hoisted, and means adapted to be connected operatively to the wheels of the truck for effecting the drive of said operative means and said shaft.

ALLEN R. FLINK.